US008027347B2

(12) United States Patent
Ould-Brahim

(10) Patent No.: US 8,027,347 B2
(45) Date of Patent: Sep. 27, 2011

(54) BORDER GATEWAY PROTOCOL EXTENDED COMMUNITY ATTRIBUTE FOR LAYER-2 AND LAYER-3 VIRTUAL PRIVATE NETWORKS USING 802.1AH-BASED TUNNELS

(75) Inventor: Hamid Ould-Brahim, Kanata (CA)

(73) Assignee: Nortel Networks Limited, St. Laurent, Quebec (CA)

(*) Notice: Subject to any disclaimer, the term of this patent is extended or adjusted under 35 U.S.C. 154(b) by 230 days.

(21) Appl. No.: 12/015,685

(22) Filed: Jan. 17, 2008

(65) Prior Publication Data

US 2008/0170573 A1 Jul. 17, 2008

Related U.S. Application Data

(60) Provisional application No. 60/880,778, filed on Jan. 17, 2007.

(51) Int. Cl.
*H04L 12/28* (2006.01)
(52) U.S. Cl. ............... 370/397; 370/392; 370/395.21; 370/395.3; 370/399; 370/401; 370/409
(58) Field of Classification Search .................. None
See application file for complete search history.

(56) References Cited

U.S. PATENT DOCUMENTS

| 6,693,878 | B1 | 2/2004 | Daruwalla ............... 370/235 |
|---|---|---|---|
| 2003/0112755 | A1 | 6/2003 | McDysan |
| 2004/0025054 | A1 | 2/2004 | Xue |
| 2004/0076165 | A1 | 4/2004 | Jean-Francois et al. |
| 2005/0053079 | A1 | 3/2005 | Havala |
| 2005/0097203 | A1* | 5/2005 | Unbehagen et al. ......... 709/223 |
| 2005/0141435 | A1 | 6/2005 | Ould-Brahim ............... 370/252 |
| 2006/0002401 | A1 | 1/2006 | Mukherjee et al. |
| 2007/0076719 | A1* | 4/2007 | Allan et al. .................. 370/392 |
| 2007/0086361 | A1* | 4/2007 | Allan et al. .................. 370/254 |

OTHER PUBLICATIONS

Wei Cao, IEEE 802.1ah Mode for Etherent Over MPSL, Networking Working Group Internet Draft, Oct. 16, 2006.*
Sangli et al. BGP Extended Communities Attribute, Network Working Group, RFC4360, Feb. 2006.*
International Search Report for international Application No. PCT/US2008/51267 dated May 8, 2008; 2 pages.
Supplementary European Search Report in European Application No. 08713796.4, dated Nov. 12, 2010 (5 pages).
First Office Action in counterpart Chinese Application No. 20088002344.9, dated Feb. 16, 2011 (15 pages).

* cited by examiner

*Primary Examiner* — Daniel J Ryman
*Assistant Examiner* — Thinh D Tran
(74) *Attorney, Agent, or Firm* — Guerin & Rodriguez, LLP; Michael A. Rodriguez

(57) ABSTRACT

Described are a network, network device, and method for a method of distributing routing information for a virtual private network (VPN) application through a packet-switched network (PSN) having fully meshed provider edge (PE) routers through Provider Backbone Bridge (PBB) tunnels. Each PE router is configured to support at least one VPN and to run a BGP (Border Gateway Protocol) as an auto-discovery process for finding one or more other PE routers attached to the same VPN. A given VPN is associated with a PBB tunnel. A service instance identifier (I-SID), as defined in IEEE 802.1*ah*, is assigned to the VPN. Each PE router advertises membership in the VPN by including the I-SID assigned to the VPN in a BGP message issued during the auto-discovery process.

18 Claims, 4 Drawing Sheets

BORDER GATEWAY PROTOCOL EXTENDED COMMUNITY ATTRIBUTE FOR LAYER-2 AND LAYER-3 VIRTUAL PRIVATE NETWORKS USING 802.1AH-BASED TUNNELS

RELATED APPLICATION

This utility application claims the benefit of U.S. Provisional Patent Application No. 60/880,778, filed on Jan. 17, 2007, the entirety of which provisional application is incorporated by reference herein.

FIELD OF THE INVENTION

The invention relates generally to virtual private networks (VPNs). More particularly, the invention relates to a Border Gateway Protocol (BGP) extended community used to control the acceptance and distribution of routing information for BGP-VPN applications transported across a packet-switched network using IEEE 802.1ah-based tunnels.

BACKGROUND

Virtual private networks, or VPNs, are becoming increasingly popular as a cost-effective means for conducting voice and data communications between, for example, corporate data centers, remote offices, mobile employees, customers, suppliers, and business partners. In general, a VPN is a private network configured within a public network, such as a service provider's network or the Internet. The VPN of a given customer appears privately dedicated to that customer, when in actuality the customer's VPN shares the same physical backbone with the VPNs of many other customers.

Increasingly, service providers are using MPLS (Multi-protocol Label Switching) tunneling to implement VPNs across their packet-switched networks. Two major types of IP/MPLS-based VPNs have arisen: (1) layer-3 VPN services, referred to as L3VPNs; and (2) layer-2 VPN services, referred to as L2VPNs. A standard for L3VPNs is described in Internet Engineering Task Force ("IETF") Request for Comments ("RFC") 4364, titled "BGP/MPLS IP Virtual Private Networks (VPNs)", the entirety of which is hereby incorporated by reference herein. Implementations of L2VPNs are described in RFC 4761, titled "Virtual Private LAN Service (VPLS) Using BGP for Auto-Discovery and Signaling", in RFC 4762, titled "Virtual Private LAN Service (VPLS) Using Label Distribution Protocol (LDP) Signaling", and in IETF draft-ietf-12vpn-signaling-08.txt, titled "Provisioning, Auto-discovery, and Signaling in L2VPNs", the entireties of which are hereby incorporated by reference herein.

Implementing a MPLS-based VPN generally requires the distribution of certain routing information between provide edge (PE) routers of the service provider's network. A commonly used inter-domain routing protocol for exchanging such routing information is the Border Gateway Protocol, or BGP. For example, using BGP messages, PE routers exchange VPN routes (layer-3) with customer edge (CE) routers and with other PE routers in the service provider network. For layer-2 VPNs, PE routers use BGP update messages to exchange VPLS (Virtual Private LAN Service) membership and demultiplexer information with other PE routers in the same VPLS.

With the advent of connection-oriented forwarding technologies such as Provider Backbone Transport (PBT) and Provider Backbone Bridge (PBB), native Ethernet is rapidly emerging as a viable packet-switched network technology. Consequently, Ethernet is becoming more widely used, particularly in metro-area networks and wide-area networks. With PBT, service providers are able to establish point-to-point and point-to-multipoint Ethernet tunnels and to specify paths that service traffic will take through their Ethernet networks. With PBB, service providers are able to separate a communications network into customer domains and service provider domains. The separation is achieved by encapsulating the customer packets within a backbone (i.e., service provider) MAC (Media Access Control) header. Network devices in the service provider domain forward packets based on the service provider MAC header while the customer header remains invisible except at the edge of the service provider domain. Having such capabilities, service providers are desirous of supporting layer-2 and layer-3 BGP-VPN applications over their Ethernet networks. Notwithstanding, to support such BGP-VPN applications, control plane mechanisms are needed by which PE routers may control what routing information to accept and distribute.

SUMMARY

In one aspect, the invention features a method of distributing routing information for a virtual private network (VPN) application through a packet-switched network (PSN) having a plurality of provider edge (PE) routers that are fully meshed through Provider Backbone Bridge (PBB) tunnels. Each PE router is configured to support at least one VPN and to run a BGP (Border Gateway Protocol) as an auto-discovery process for finding one or more other PE routers attached to the same VPN. A given VPN is associated with a PBB tunnel. An I-component service instance identifier (I-SID) is assigned to the VPN. Each PE router advertises membership in the VPN by including the I-SID assigned to the VPN in a BGP message issued during the auto-discovery process.

In another aspect, the invention features a packet-switched network comprising a plurality of provider edge (PE) routers fully meshed by Provider Backbone Bridge (PBB) tunnels. Each PE router is configured to support of a virtual private network (VPN) and to run a Border Gateway Protocol (BGP) as an auto-discovery mechanism for finding one or more other PE routers in the same VPN. The VPN is associated with one of the PBB tunnels and has an assigned I-component service instance identifier (I-SID). Each PE router advertises membership in the VPN by including the I-SID assigned to the VPN in a BGP message issued during the auto-discovery process.

In still another aspect, the invention features a provider edge (PE) router configured to support of a virtual private network (VPN) over a packet-switched network through a Provider Backbone Bridge (PBB) tunnel. The PE router includes a service processor assigning an I-component service instance identifier (I-SID) to the VPN. Memory stores a mapping of the VPN to the PBB tunnel and program code with computer-readable instructions for performing a Border Gateway Protocol (BGP) auto-discovery process for finding one or more other PE routers in the same VPN. A processor executes the computer-readable instructions to produce a BGP message that includes the I-SID assigned to the VPN in order to advertise membership in the VPN during the auto-discovery process.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Service provider (SP) networks constructed in accordance with the invention use BGP as an auto-discovery mechanism to support the delivery of VPN services across packet-switched networks through PBB or PBT/PBB tunnels. Examples of supported VPN applications that use BGP as an auto-discovery mechanism—referred to herein as BGP-VPN applications—include, but are not limited to, BGP/MPLS IP VPNs (RFC 2547, RFC 4364, VPLS-BGP, VPLS-LDP (Label Distribution Protocol) using BGP, L2VPN using BGP, and multi-segment pseudowire using BGP.

In brief overview, an SP network includes a plurality of provider edge (PE) routers fully meshed by PBB tunnels. Each PE router is configured to support of a VPN and to run BGP as an auto-discovery mechanism for finding other PE routers in the VPN. The VPN is associated with one of the PBB tunnels and has an assigned Service Instance Identifier (I-SID). The I-SID field, as defined in IEEE 802.1ah, identifies the service instance assigned by the backbone to the VPN. In accordance with the present invention, the I-SID also serves to encode the VPN membership of the VPN client sites. Each PE router advertises the set of VPN members attached to it by including the I-SID assigned to the VPN in a BGP message issued by that PE router during the auto-discovery process.

To encode the I-SID, the BGP-enabled PE routers include, in their BGP update messages, an Extended Community attribute containing the I-SID assigned to the VPN. The Extended Community attribute can signify a Route Target community, as defined in RFC 4360, or a new PBB or 802.1ah Community newly defined specifically for carrying I-SID values.

Thus, when a service provider configures the VPN across a PBB tunnel (i.e., assigns the I-SID) the service provider is also defining the BGP community. The I-SID of the invention has two primary roles: (1) to operate as an 802.1ah service identifier; and (2) to identify the BGP community for the VPN.

The inclusion of I-SIDs in BGP update messages to identify VPN membership advantageously dispenses with any need for the PE routers to maintain tables that map I-SIDs to VPN communities; no such mapping is needed because the I-SID is the VPN community.

Figure 1:
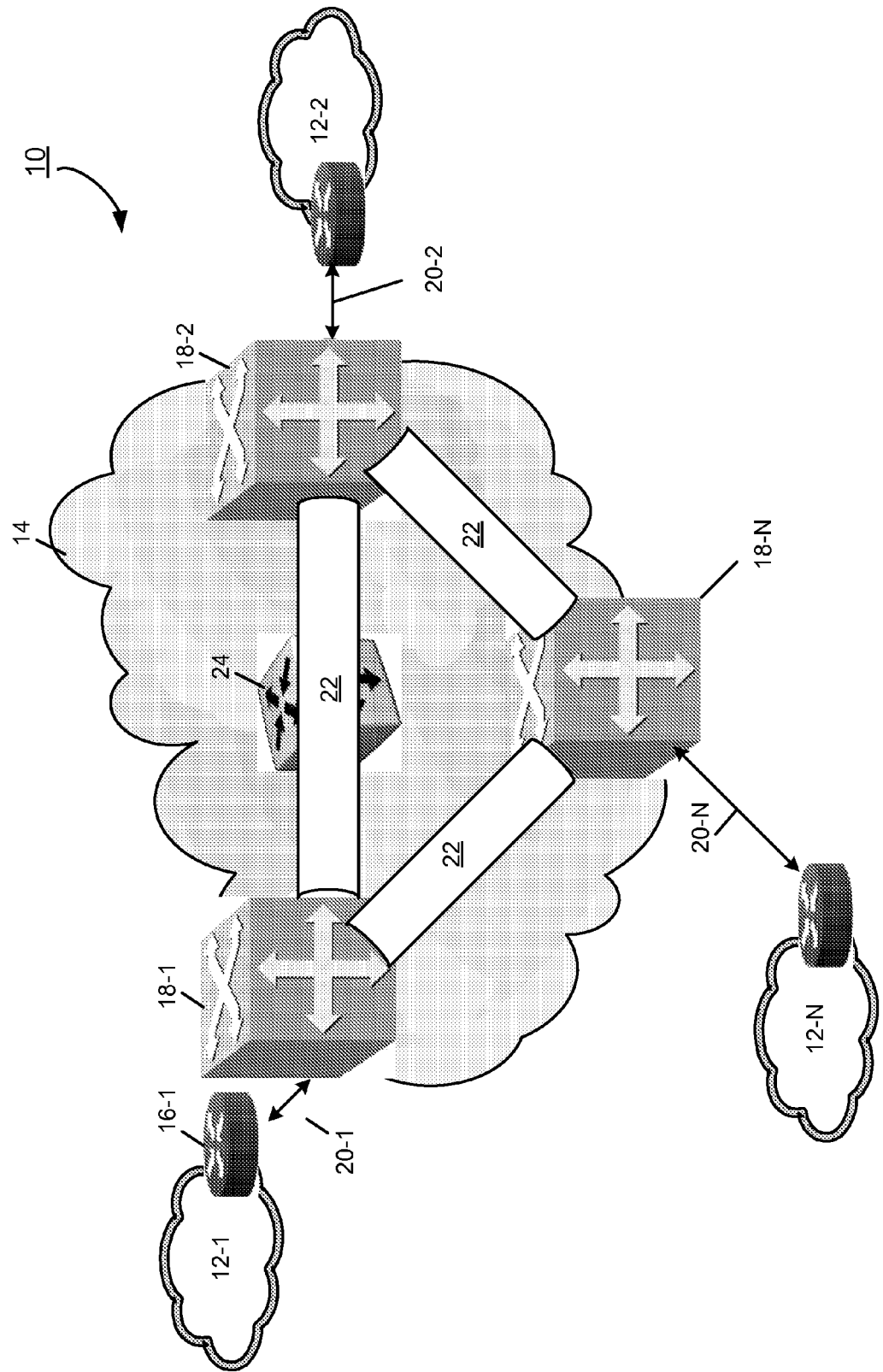
FIG. 1 is a block diagram representation of a simplified embodiment of a communications network that includes provider edge (PE) routers configured to enable layer-2 and layer-3 BGP-VPN applications to send data packets across a packet-switched network through 802.1ah-based tunnels.

FIG. 1 shows an embodiment of an exemplary communications network 10 in which the principles of the invention may be practiced. The communications network 10 includes one or more customer sites or networks 12-1, 12-2, 12-*n* (generally, 12) in communication with a packet-switched network (PSN) 14. Each customer site 12-1, 12-2, 12-*n* includes a customer edge (CE) router 16-1, 16-2, 16-*n* (generally, 16), respectively.

The PSN 14 corresponds to a network domain managed by a service provider (or by multiple service providers that contract to support a VPN service). The PSN 14 includes provider edge (PE) routers 18-1, 18-2, 18-*n* (generally, 18). In general, a PE router 18 is a network element—also referred to as a device or as a node—that communicates with one or more CE routers 16. For example, PE router 18-1 is in communication with CE router 16-1, PE router 18-2 is in communication with CE router 16-2, and PE router 18-*n* is in communication with CE 16-*n*. Typically, the PSN 14 has more PE routers 18 than those shown, and each PE router 18 can be in communication with more than one CE router 16.

Customers (i.e., owners of the customer sites 12) obtain VPN services from the service provider. Examples of customers include, but are not limited to, Internet Service Providers (ISP), an enterprise, a group of enterprises, an application service provider, and other service providers of VPN services. BGP-VPN applications can originate or terminate (or both) at the CE sites 12. The BGP-VPN applications supported by the customer site 12-1 can be the same as or different from those supported by the other customer sites 12-2, 12-*n*. In addition, a given customer site 12 can be in more than one VPN (i.e., an intranet and one or more extranets).

Each CE 16-1, 16-2, 16-*n* is in communication with the PE 18-1 over respective links (i.e., attachment circuits) 20-1, 20-2, 20-*n*. Generally, an attachment circuit is part of a user-to-network interface between a PE router 18 and a CE router 16 and comprises a physical or logical link configured for the particular technology of the network service. Example embodiments of attachment circuits include, but are not limited to, a frame relay DLCI (data link connection identifier), an ATM VPI/VCI (virtual path identifier/virtual channel identifier), an Ethernet port, a VLAN (virtual LAN), an HDLC (high-level data link control) link, a PPP (point-to-point protocol) connection on a physical interface, a PPP session from an L2TP (Layer 2 tunneling protocol) tunnel, and an MPLS LSP (label switch path).

In one embodiment, the PSN 14 is configured as a Provider Backbone Bridge (PBB) network, also known as IEEE 802.1ah and MAC-in-MAC (MiM). The IEEE 802.1ah draft standard defines a service provider MAC header (referred to herein as a PBB header) that encapsulates a customer MAC frame. The PBB header includes B-MAC SA and B-MAC DA fields to indicate the source address and destination address, respectively, of the backbone (i.e., PSN 14). Also defined are a backbone VLAN ID (B-VID) and a Service Instance identifier (I-SID).

In a PBB network, devices (or nodes) can make packet forwarding decisions based on the values in the B-MAC and B-VID fields. Accordingly, PBB provides Ethernet tunneling based on: 1) the B-MAC SA/DA pair; and 2) the B-VID. The I-SID field serves to identify the service in the service provider's network 14. The size of the I-SID field, 24-bits, theoretically supports as many as 16 million service instances.

In another embodiment, the PSN 14 is configured to support Provider Backbone Transport (PBT) technology in conjunction with PBB. In brief overview, PBT provides the PSN 14 with connection-oriented forwarding behavior. Through PBT, service providers are able to establish point-to-point Ethernet tunnels and specify paths that service traffic will take through their Ethernet networks. More specifically, PBT allocates a range of VLAN IDs (B-VIDs) to identify specific paths through the PSN 14 to a given destination MAC address. PBT requires the combination of B-VID and the destination B-MAC DA address (total 60 bits) to be globally unique, but individually the B-VID or B-MAC does not have to be globally unique for PBT trunks. Because the combination of the B-MAC DA and the B-VID uniquely identifies each path, B-VIDs within the reserved range can be reused to identify paths between different pairs of PE routers.

In FIG. 1, the PE routers 18 are logically fully meshed with 802.1ah (i.e., PBB or MiM) tunnels 22. Fully meshed means that there is a PBB tunnel 22 between each pair of PE routers 18 in the PSN 14. Packets belonging to a VPN service, such as VPLS, are encapsulated with a PBB header and forwarded through one of the PBB tunnels 22. Such tunnels 22 are established independently of the VPN service through manual or automatic provisioning (e.g., through a control plane). Various intermediate routers (called provider-only or P-nodes), such as P-node 24, may participate in the forwarding of VPN packets through a PBB tunnel 22. Only one such P-node 24 is shown to simplify the illustration.

Before data packets belonging to a given VPN can traverse the PSN 14 through a PBB tunnel 22, the PE routers 18 perform auto-discovery to determine which other PE routers are in the same VPN. In one embodiment, each PE router 18 runs the Multi-protocol Border Gateway Protocol (MP-BGP), described in RFC 2858, to perform auto-discovery and advertise VPN routes to each other. Accordingly, each such PE router 18 is considered a MP-BGP network device.

In brief overview, PE routers of a service provider (SP) network exchange BGP messages to advertise VPN routes through the PSN 14 and to associate such routes with PBB tunnels 22. Mechanisms for advertising VPN routes using MG-BGP are described in U.S. patent application Ser. No. 12/015,632, filed on Jan. 17, 2008, the entirety of which is incorporated by reference herein.

In general, MP-BGP network devices establish a reliable transport protocol connection with each other, exchange messages to open a BGP session, and then exchange their routing information (i.e., routing table). In general, this routing information includes the complete route to each network destination reachable from a BGP network device. Each route comprises a destination address and information that describes the path to the address destination. Throughout an established BGP session, MP-BGP network devices maintain their routing information by exchanging incremental updates, such as the advertisement of new routes or withdrawals of existing routes. MP-BGP network devices use BGP update messages to advertise VPN routes to other PE routers.

A BGP update message includes, among other fields, a message header, a Path Attributes field, and a Multi-protocol attribute. The multi-protocol attribute (called MP-BGP) includes a field called Network Layer Reachability Information (NLRI) field. MP-BGP attribute includes a Next Hop field and the BGP update message includes the Next hop field for each route being advertised in the BGP update message. Both fields are identical. The NLRI field provides the address field of each feasible route being advertised in the BGP update message. In addition, the NLRI field includes an Address Family Identifier (AFI) field and a Subsequent Address Family Identifier (SAFI) field. In general, the AFI field carries the identity of the network layer protocol associated with the network address that follows, and the SAFI field provides additional information about the type of Network Layer Reachability information carried in the attribute.

MP-BGP also implements a BGP Extended Community Attribute (RFC 4360, titled "BGP Extended Communities Attribute"), as an optional path attribute that provides a mechanism for labeling information carried in BGP update messages. The PE routers use information carried by the BGP Extended Community attribute to control which VPN routes they accept. The attribute has an eight octet value that specifies a community. All routes with this attribute belong to the communities listed in the attribute.

One defined extended community is called the Route Target community. Generally, the Route Target community operates to identify one or more routers that may receive a set of routes carried in a BGP message. Each VPN route advertised in a BGP update message includes a Route Target, indicating to which VPN (or group of customer sites) the VPN route belongs (each VPN has an associated unique Route Target value). A given PE router 18 keeps track of those Route Targets that are associated with the VPNs that the PE router 18 carries. Upon receiving a BGP update message, the PE router 18 accepts those advertised routes having a matching Route Target and ignores those that do not.

Figure 2:
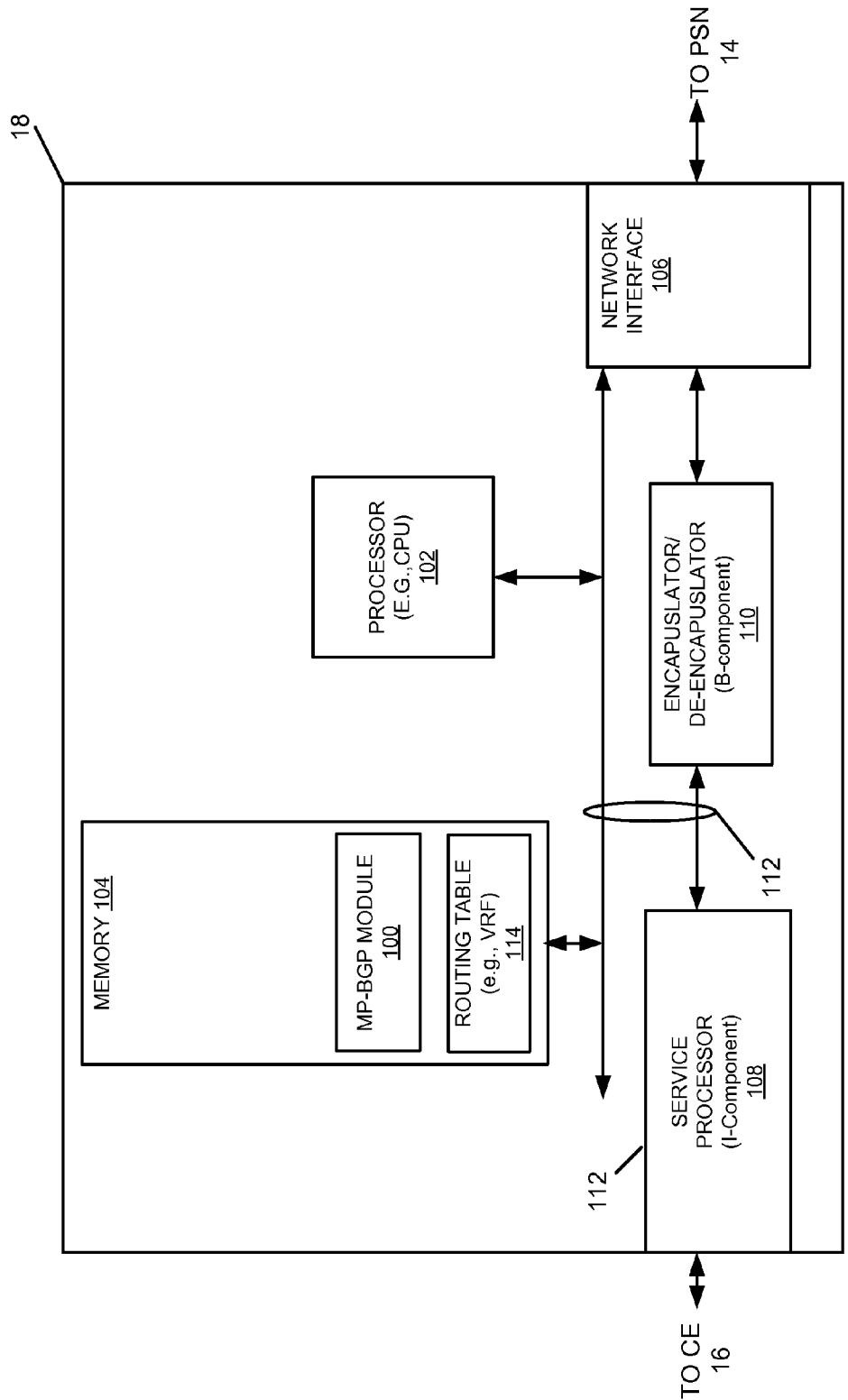
FIG. 2 is a block diagram representation of a simplified embodiment of a PE router.

FIG. 2 shows an oversimplified embodiment of a PE router 18 (e.g., ingress PE router 18-1) including a processor 102, memory 104, a network interface 106, a service processor 108, and an encapsulator/de-encapsulator 110 connected to a system bus 112. The system bus 112 represents generally the various communication paths among the components of the PE router 18, and may in practice be implemented with one or more connected and/or independent signal buses.

In brief overview, the memory 104 includes a MP-BGP module 100 and a routing table 114 (e.g., a Virtual Routing and Forwarding Table or VRF). The processor 102 executes the MP-BGP module 100 for performing auto-discovery, generating BGP update messages, distributing VPN routing information as described herein. The routing table 114 maintains, among other things, a mapping of VPN routes for VPNs and their corresponding PBB tunnels.

The service processor 108, also referred to as I-component, receives VPN packets belonging to various VPN services from a customer network 12, associates the packets of each VPN service with a service identifier (I-SID), and delivers the packets to the encapsulator 110.

The encapsulator 110 produces an Ethernet frame for transmission by the network interface 106 over the PBB tunnel 22 by encapsulating the VPN packets in a PBB header. As part of the encapsulation, the PE router 18 uses the (foreknown) MAC address (B-DA) of the destination PE router 18 at the remote end of the PBB tunnel 22.

Figure 3:
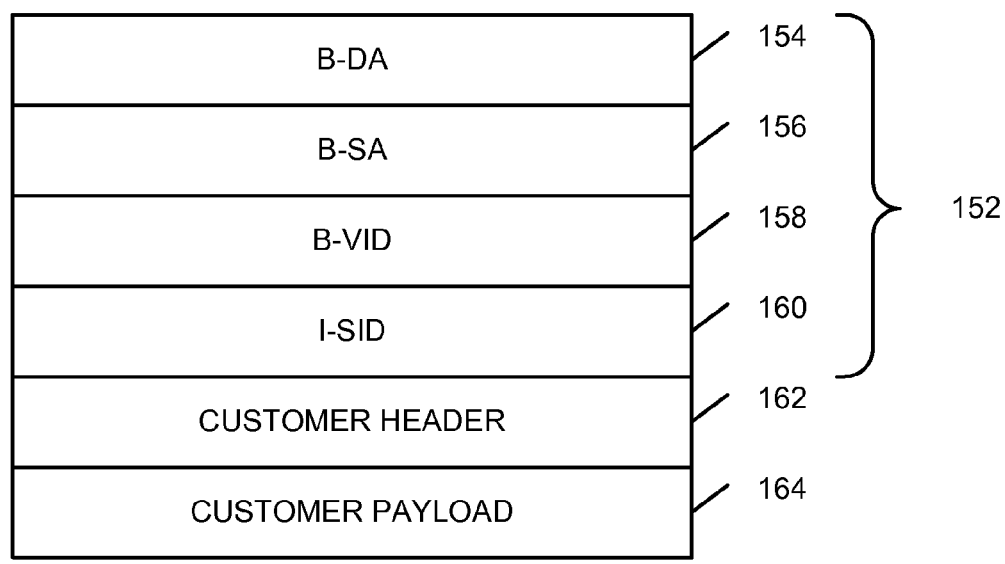
FIG. 3 is a simplified representation of an embodiment of a frame format for VPN data packets transmitted through an 802.1ah-based tunnel.

FIG. 3 is a simplified representation of a frame format 150 for VPN data packets transmitted through a PBB tunnel. The frame format 150 includes a PBB header 152 comprised of a backbone destination address (B-DA) 154, a backbone source address (B-SA) 156, a backbone VLAN ID (B-VID) 158, and a backbone I-component service ID (I-SID) 160. The PBB header 152 encapsulates the customer header 162 and customer payload 164

When the provider PSN 14 uses PBB in conjunction with PBT, the PE routers send the VPN data packets through a PBB-in-PBT tunnel, that is, a PBT header includes the PBB header 152 with the I-SID.

Figure 4A:
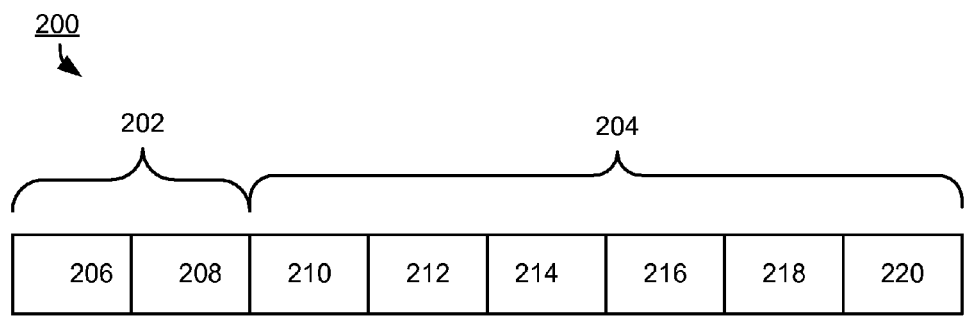
FIG. 4A is a diagram of an embodiment of a data structure for a BGP extended community attribute in accordance with the invention, the BGP extended community attribute including a type field and a value field.

FIG. 4A shows an embodiment of a data structure 200 for a BGP extended communities attribute of the present invention. The extended community is an 8-octet quantity including a type field 202 comprised of two octets and a value field 204 comprised of six octets. The type field 202 includes a high-order octet 206 and a low-order octet 208.

Figure 4B:
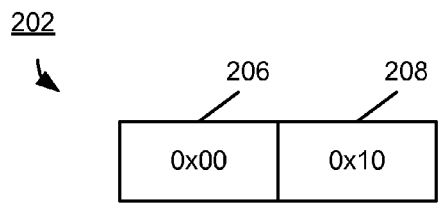
FIG. 4B is a diagram of the type field which includes an exemplary value for signifying that the BGP extended community is for a PBB community.

FIG. 4B shows the type field 202 with exemplary values in the high-order and low-order octets, 206, 208, respectively, for creating a new extended community for carrying I-SID values. Such an extended community can be called a PBB Community or an 802.1ah Community. Here, in FIG. 4B, the value stored in the high-order octet 206 is 0x00 and the value stored in the low-order octet 208 is 0x10. These values are exemplary for creating a new extended community; in general, the high-order and low-order octets, 206, 208 can have any value that does not conflict with existing values assigned by IETF standards to these octets.

Figure 4C:
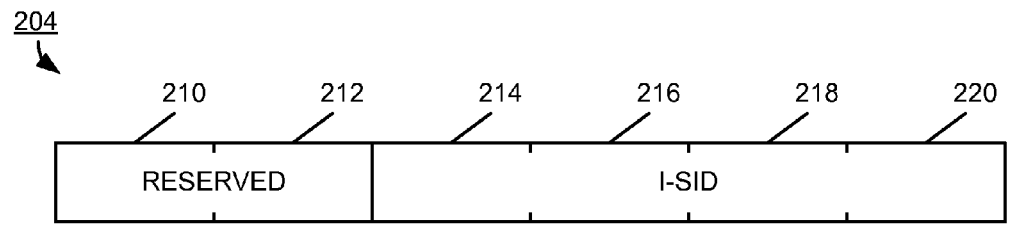
FIG. 4C is a diagram of the value field which includes an 802.1ah I-component Service Identifier (I-SID) when the type field signifies that the BGP extended community is a PBB community.

The value stored in the low-order octet 208 operates to identify the structure of the value field 204. In one embodiment, shown in FIG. 4C, two high-order octets 210, 212 of the value field 204 are reserved and the four low-order octets 214, 216, 218, 220 of the value field 204 hold an I-SID value. Depending upon the definition of the PBB community, a 24-bit I-SID may be defined to occupy the three most significant octets 214, 216, 218 or the three least significant octets 216, 218, 220 of the value field 204.

An alternative to creating a new extended community for carrying the I-SID value, as described above in FIGS. 4B and 4C, is to use the existing Route Target community. To indicate that the extended community is a Route Target community, the value of the low-order octet 208 of the type field 202 is 0x02, as set forth in RFC 4360. Again, the value field 204 holds the I-SID value in its three most or three least significant octets. Each PE router receiving a BGP message with a specified Route Target community uses the value in the value field 204 to interpret VPN membership (i.e., the I-SID).

Program code (or software) of the present invention may be embodied as computer-executable instructions on or in one or more articles of manufacture, or in or on computer-readable medium. A computer, computing system, or computer system, as used herein, is any programmable machine or device that inputs, processes, and outputs instructions, commands, or data. In general, any standard or proprietary, programming or interpretive language can be used to produce the computer-executable instructions. Examples of such languages include C, C++, Pascal, JAVA, BASIC, Visual Basic, and Visual C++.

Examples of articles of manufacture and computer-readable medium in which the computer-executable instructions may be embodied include, but are not limited to, a floppy disk, a hard-disk drive, a CD-ROM, a DVD-ROM, a flash memory card, a USB flash drive, an non-volatile RAM (NVRAM or NOVRAM), a FLASH PROM, an EEPROM, an EPROM, a PROM, a RAM, a ROM, a magnetic tape, or any combination thereof. The computer-executable instructions may be stored as, e.g., source code, object code, interpretive code, executable code, or combinations thereof. Further, although described predominantly as software, embodiments of the described invention may be implemented in hardware (digital or analog), software, or a combination thereof.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method of distributing routing information for a virtual private network (VPN) application through a packet-switched network (PSN) having a plurality of provider edge (PE) routers that are fully meshed through Provider Backbone Bridge (PBB) tunnels, the method comprising:
    configuring each PE router to support at least one VPN and to run a BGP (Border Gateway Protocol) as an auto-discovery process for finding one or more other PE routers attached to a same VPN as that PE router;
    associating a given VPN with a PBB tunnel;
    assigning an I-component service instance identifier (I-SID) to the given VPN;
    advertising, by at least one PE router, membership in the given VPN by including the I-SID assigned to the given VPN in a BGP message issued during the auto-discovery process.

2. The method of claim 1, wherein the BGP message includes an Extended Community attribute for carrying the I-SID assigned to the given VPN.

3. The method of claim 1, wherein the BGP message includes an Extended Community having a type field and a value field, the type field having a value signifying that the Extended Community is a Route Target, and wherein the value field carries the I-SID assigned to the given VPN.

4. The method of claim 1, wherein the BGP message includes an Extended Community having a type field and a value field, the type field having a value signifying that the Extended Community is a PBB Community, and wherein the value field carries the I-SID assigned to the given VPN.

5. The method of claim 1, further comprising the step of encapsulating packets belonging to the given VPN for forwarding through the PBB tunnel in a PBB header that includes the I-SID.

6. The method of claim 1, further comprising the step of encapsulating packets belonging to the given VPN associated with the PBB tunnel in a PBT (Provider Backbone Transport) tunnel.

7. A packet-switched network comprising a plurality of provider edge (PE) routers fully meshed by Provider Backbone Bridge (PBB) tunnels, each PE router being configured to support a virtual private network (VPN) and to run a Border Gateway Protocol (BGP) as an auto-discovery mechanism for finding one or more other PE routers in the same VPN, the VPN being associated with one of the PBB tunnels and having an assigned I-component service instance identifier (I-SID), each PE router advertising membership in the VPN by including the I-SID assigned to the VPN in a BGP message issued during the auto-discovery process.

8. The network of claim 7, wherein the BGP message includes an Extended Community attribute for carrying the I-SID assigned to the VPN.

9. The network of claim 7, wherein the BGP message includes an Extended Community having a type field and a value field, the type field having a value signifying that the Extended Community is a Route Target, and wherein the value field carries the I-SID assigned to the VPN.

10. The network of claim 7, wherein the BGP message includes an Extended Community having a type field and a value field, the type field having a value signifying that the Extended Community is a PBB Community, and wherein the value field carries the I-SID assigned to the VPN.

11. The network of claim 7, wherein one of the PE routers encapsulates packets belonging to the VPN for forwarding through the PBB tunnel in a PBB header that includes the I-SID.

12. The network of claim 7, wherein one of the PE routers encapsulates packets belonging to the given VPN associated with the PBB tunnel in a PBT (Provider Backbone Transport) tunnel.

13. A provider edge (PE) router configured to support a virtual private network (VPN) over a packet-switched network through an Provider Backbone Bridge (PBB) tunnel, the PE router comprising:
- a service processor assigning an I-component service instance identifier (I-SID) to the VPN;
- memory storing a mapping of the VPN to the PBB tunnel and program code with computer-readable instructions for performing a Border Gateway Protocol (BGP) auto-discovery process for finding one or more other PE routers in the same VPN; and
- a processor executing the computer-readable instructions to produce a BGP message that includes the I-SID assigned to the VPN in order to advertise membership in the VPN during the auto-discovery process.

14. The PE router of claim 13, wherein the BGP message includes an Extended Community attribute for carrying the I-SID assigned to the VPN.

15. The PE router of claim 13, wherein the BGP message includes an Extended Community having a type field and a value field, the type field having a value signifying that the Extended Community is a Route Target, and wherein the value field carries the I-SID assigned to the VPN.

16. The PE router of claim 13, wherein the BGP message includes an Extended Community having a type field and a value field, the type field having a value signifying that the Extended Community is a PBB Community, and wherein the value field carries the I-SID assigned to the VPN.

17. The PE router of claim 13, further comprising an encapsulator encapsulating packets belonging to the VPN for forwarding through the PBB tunnel in a PBB header that includes the I-SID.

18. The PE router of claim 17, wherein the encapsulator further encapsulates the packets belonging to the VPN in a PBT (Provider Backbone Transport) header.

* * * * *